United States Patent Office 3,375,791
Patented Apr. 2, 1968

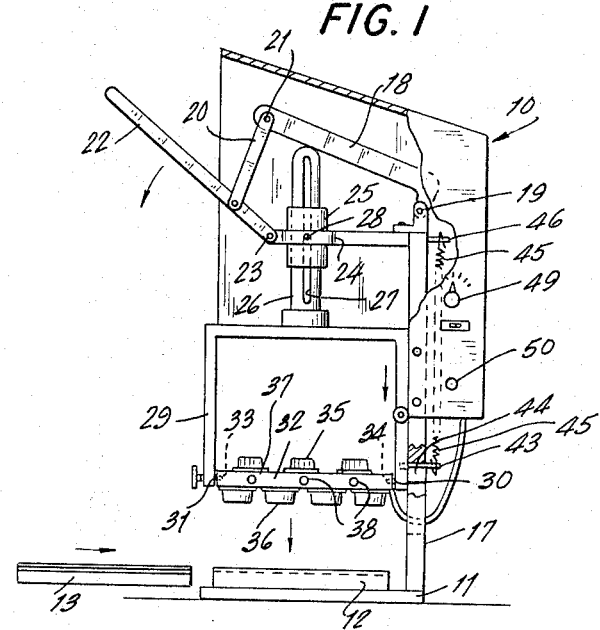

3,375,791
MINIATURE TART SHELL MOULDING MACHINE
Bernard Bennett Pakula, 12 Dalewood Drive,
Suffern, N.Y. 10901
Filed June 25, 1965, Ser. No. 467,002
2 Claims. (Cl. 107—15)

ABSTRACT OF THE DISCLOSURE

A device for moulding shells for filled bakery products in which a base supports a removable multi-cavity dough receiving pan. An upstanding member on the base carries a heated plate having die members cooperating with the cavities to mould the dough, said plate being movable into and out of engagement with the pan.

---

This invention relates to machines for moulding the shells of filled bakery products and more specifically to machines for making filled bakery products of extremely small size.

Where it is desired to bake filled cakes, tartlets and the like of extremely small size, it has heretofore been necessary to prepare the edible shells and fill them by hand. As a result, such bakery products have increased in cost to a point where in many instances they are no longer sold. While it is known to prepare pie crusts and large edible containers for baked food stuffs by machine, there has heretofore been no mechanism for accomplishing the delicate hand work required for small or miniature filled baked products.

Accordingly, it is an object of the present invention to provide a machine which will greatly facilitate the baking of miniature filled baked products.

Another object of the present invention is to provide a machine which eliminates much of the hand operations customary in the baking of miniature filled baked products.

Still another object of the present invention is to provide a machine which will greatly reduce the time consumed in forming the edible shells required for filled baked products.

Still another object of the present invention is to provide a machine which will turn out miniature filled baked products with uniformity and great savings in labor.

In the accompanying drawing, forming a part hereof is illustrated one form of embodiment of the invention, and in which:

FIGURE 1 is a view in side elevation of the complete embodiment of the present invention with certain portions cut away for the purpose of illustration.

FIGURE 2 is a view in front elevation of a machine shown in FIGURE 1.

FIGURE 3 is a fragmentary view taken on line 3—3 in FIGURE 2 looking in the direction of the arrows.

FIGURE 4 is a fragmentary view taken on line 4—4 in FIGURE 2 looking in the direction of the arrows, on an enlarged scale.

FIGURE 5 is a fragmentary view of the male and female shell forming dies shown in FIGURES 1 and 2, on an enlarged scale.

FIGURE 6 is a view similar to FIGURE 5 showing the dies in the nested or moulding position.

FIGURE 7 is a fragmentary view of the female dies with the shell moulded therein.

FIGURE 8 is a somewhat isometric view of one form of a shell formed by the present invention.

FIGURE 9 is a somewhat isometric view of a second form of a shell made by the present invention.

Referring to the drawings and particularly to FIGURES 1 and 2, 10 indicates a tart shell forming machine carried upon a base plate 11. The plate 11 is provided with spaced flange members 12 to receive a pan 13 therebetween. The pan 13 is made of metal and is provided with a plurality of cavities 14 into which small quantities of dough 15 are placed (see FIGURE 5). It will be observed from an examination of FIGURES 5 and 6 that the flange members 12 extend inwardly as indicated at 16 and overlie the edges of the pan 13. In this manner, the pan 13 cannot be lifted vertically during the moulding operation and can only be slid in and out of the spaced flange members 12 horizontally, as shown in FIGURE 13. A vertical support 17 is secured to the rear of the plate 11 and extends upwardly therefrom. A beam 18 is pivotally secured at one end to the top of the support 17 as indicated at 19. The opposite end of the beam 18 overlies the plate 11 and has a link 20 pivotably secured to the end thereof as indicated at 21. The opposite end of the link 20 is coupled to an actuating arm 22 which is swingably secured at its inner end 23 to a bracket 24 which supports a sleeve bearing 25.

The bracket 24 is secured at its inner end to the vertical support 17 in a fixed horizontal position. A spindle 26 is slidably carried within the sleeve bearing 25 and is provided with a key-way 27 within which a pin 28 slides to prevent rotation of the said spindle 26. The pin 28 is carried by the sleeve bearing 25 and extends into the key-way 27.

A substantially inverted U shaped frame 29 is secured to the bottom of the spindle 26 as best shown in FIGURES 1 and 2. The lower portion of the frame 29 is open and the free ends thereof 30, 31 support a male die plate member 32 therebetween.

The die plate 32 is pivotally mounted at 33, 34 so that either of its faces may be presented to the pan 13.

As shown in FIGURES 1, 2, 5, and 6, the die plate consists of a flat plate-like member 37 to each major face of which there is secured a plurality of male members 35, 36. The male members 35, 36 correspond in shape to the cavities 14 within the pan 13 selected for baking the shell. The plate-like member 37 is also provided with a plurality of heating elements 38 which extend throughout the said member 37 and are capable of heating the male members 35, 36 to a desired temperature.

The frame 29, as best shown in FIGURES 2 and 4 is provided with a laterally offset portion 39 in which there is carried a spring loaded plunger 40. The spring loaded plunger 40 is in register with one of two holes 41 provided in the edge of the plate 37. It is the function of the plunger 40 to lock the plate in position after the appropriate die has been selected for use. Thus, if a somewhat conical die is required as shown at 36 the plunger 40 is pulled out and the plate turned over to bring the conical die to the bottom of the assembly. The plunger 40 is then released and the small detent 42 will snap into the hole 41 adjacent thereto in the plate 37. In order to reverse the plate it is merely necessary to pull the spring loaded plunger 40 out, spin the plate upon the pins 33, 34 and release the plunger again to engage the opposite hole 41. The male die member is thus firmly brought into register overlying the pan 13 for the moulding operation.

A short pin 43 is secured to the back of the frame 29 and extends outwardly therefrom into a slot 44 in the vertical support 17. A coil spring 45 is secured at one end to the pin 43 and at its upper end to a second pin 46 attached to the support member 17. The spring 45 is in its unstressed position when the frame 29 is at the top of its movement within the machine.

As the arm 22 is moved down it pulls with it the beam 18 through the connection of the link 20. The beam 18 rides upon the top of the spindle 26 as shown in FIGURE 1 and forces it through the sleeve bearing 25. The plate 32 is thus moved down into engagement with the pan 13 therebelow. As the male die members enter the cavities 14 of the pan, the dough 15 is forced upwardly and around the male die members in the manner shown in FIGURE 6.

It will be noted that the cavities 14 are provided with raised edges forming collars 47 against which the shoulders 48 of the male die members abut. The collars 47 and shoulders 48 serve to trim the dough 15 as it is forced out of the cavities 14. When the male and female die members are brought into engagement as shown in FIGURE 6 they are maintained in position against the dough 15 for an interval of time sufficiently long to drive some of the moisture out of the dough and render it firm and stable. Thereafter, the handle 22 is released, the spring 45 returns the frame 29 to its original position, and the male dies are withdrawn from the formed shells. The flanges 12 prevent the pan 13 from being lifted with the male dies during this operation.

Heat to the plate 37 is controlled by means of a rheostat 49 and a small light 50 connected to a thermocouple (not shown) indicates when the temperature in the male die has been brought up to the desired setting of the rheostat 49.

While the male and female dies illustrated herein have been shown forming as a somewhat conical shell as indicated at 36' in FIGURE 8 or triangular as indicated at 35' in FIGURE 9, it is to be understood that any ornamental shape may be used in the male and female dies without departing from the spirit of the invention.

After the shells have been formed in the manner hereinabove set forth the pans 13 are slid out of the flanged members 12, filled with a suitable food stuff such as jelly, jam, nuts, etc., and then baked in an oven in the customary manner. The baking time and the time during which the male and female members are kept in contact with the dough depends upon the specific mixture of the dough, its moisture content, and its other ingredients From the foregoing it will be seen that there has been provided a machine for quickly moulding a large number of very small shells for use in manufacturing filled bakery products. The device is simple to operate, produces a uniform product and lends itself to a wide variety of shapes and sizes.

Having thus fully described the invention, what is claimed as new and desired to be secured by Letters Patent of the United States, is:

1. Apparatus for simultaneously moulding a plurality of bakery product shells comprising a base, laterally disposed flanged members on said base, a multi-cavity pan slidably carried upon the base and partially underlying the said flanged members, a support secured at one end to the base and extending upwardly therefrom, a frame carried by the support overlying the base, a plate-like member having opposed major faces thereon and pivotally secured to and reciprocably carried by the frame on the support, die members of different configuration extending outwardly from the major faces on the plate-like member for cooperative engagement with the cavities in different pans, means to heat the die members and means to move the die members into and out of operative engagement with the pan cavities whereby a charge of dough within each of the pan cavities will be formed into individual shells.

2. Apparatus for simultaneously moulding a plurality of bakery product shells comprising a base, laterally disposed flanged members on said base, a multi-cavity pan slidably carried upon the base and partially underlying the said flanged members, a support secured at one end to the base and extending upwardly therefrom, a sleeve bearing coupled to the support and disposed above the base, a spindle slidably carried within the sleeve bearing, a frame secured to the bottom of the spindle overlying the base, a plate-like member reciprocably carried by the frame, die members on the plate-like member for cooperative engagement with the cavities in the pan, cooperating flange and collar members on the die and pan structures to trim the dough extruded from the cavities, means to heat the die members and means to move the die members into and out of operative engagement with the pan cavities whereby a charge of dough within each of the pan cavities will be formed into individual shells.

References Cited
UNITED STATES PATENTS

| 492,531 | 2/1893 | Gaudie | 107—15 |
| 1,752,837 | 4/1930 | Corns | 107—15 |
| 2,249,667 | 7/1941 | Richardson | 107—15 |

FOREIGN PATENTS

| 21,248 | 1929 | Australia. |
| 28,637 | 1903 | Great Britain. |

WILLIAM I. PRICE, *Primary Examiner.*

JOSEPH SHEA, *Assistant Examiner.*